2,837,708

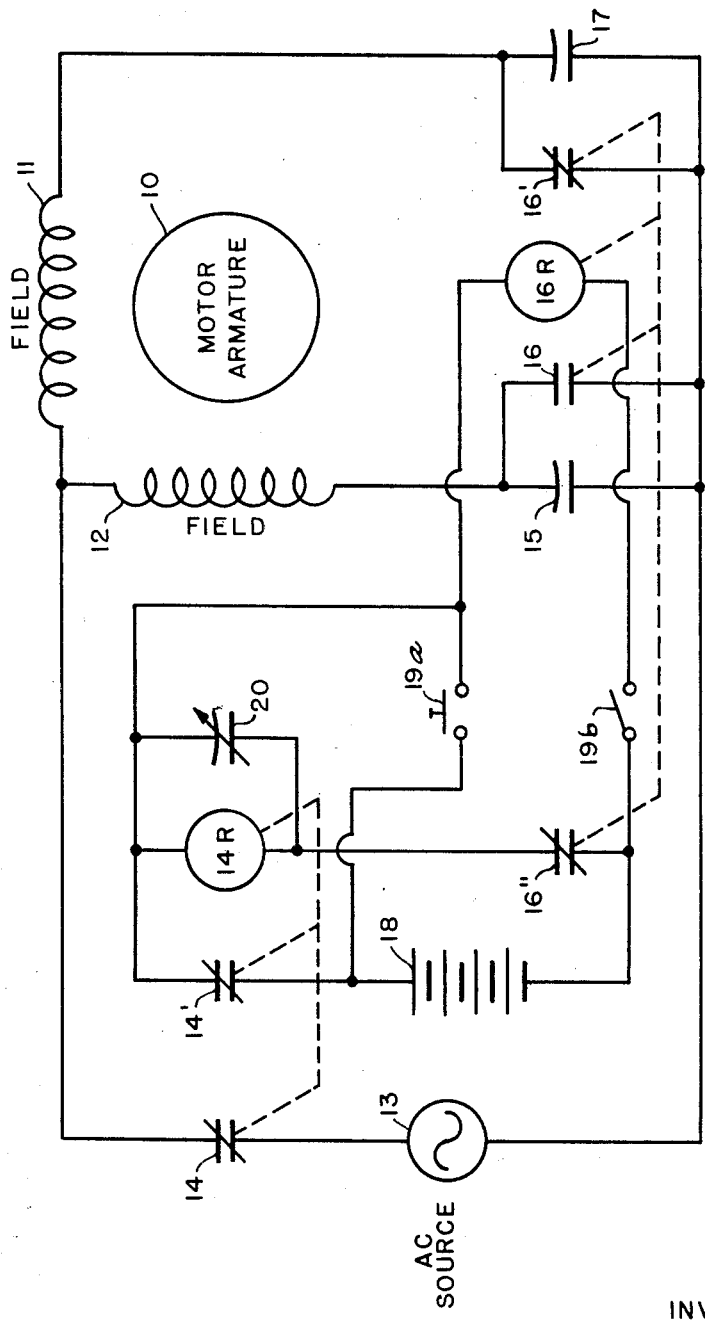

DYNAMIC BRAKING OF CAPACITOR MOTOR

Robert R. Jones and Stephen Kowalyshyn, Sharon, Pa., assignors, by mesne assignments, to the United States of America as represented by the Secretary of the Navy Application August 24, 1954, Serial No. 451,993

4 Claims. (Cl. 318—210)

The present invention relates to controls for electric motors and has more particular reference to a control circuit for effecting rapid dynamic braking of capacitor motors.

In various applications employing capacitor motors, such as the steering systems of certain torpedoes, it is necessary that provision be made for the rapid and positive braking of the motors. Heretofore, many braking arrangements have been devised for capacitor motors, and while such prior arrangements were satisfactory for use in other installations, they proved to be unsuitable for use in certain torpedo steering systems owing to the complexity, size, and/or relatively slow response of such prior arrangements.

The present invention provides a relatively simple and rapid acting braking system intended for capacitor motors in particular, which system is especially adaptable for use in torpedoes, wherein size and weight limitations are critical. In substance, the invention as applied to capacitor motors comprises a control circuit which, upon actuation of a motor stop switch, operates to apply reverse power to the motor by switching of motor field condensers and to maintain the application of such reverse power until the motor stops, the latter function being accomplished by means of a delay circuit including a condenser arranged in shunt with a relay. The capacity of this condenser is made such that the time required for discharge of the condenser to a predetermined value through the relay is just sufficient to enable the reverse power to bring the motor to a stop.

In accordance with the foregoing, an object of the invention is the provision of apparatus for effecting rapid dynamic braking of a capacitor motor.

Another object of the invention is the provision of dynamic braking apparatus for a capacitor motor wherein, upon actuation of a motor stop switch, reverse power is applied to the motor by switching of motor field condensers, the application of such reverse power being maintained, by means of discharge of a condenser through a motor control relay, until the motor is brought to a stop.

Other objects and advantages of the invention will become apparent as the same becomes better understood from the following detailed description had in conjunction with the annexed drawing wherein:

The single figure is a schematic showing of an A. C. motor and associated control circuitry as an exemplary embodiment of the present invention.

Referring now to the drawing, 10 denotes the armature of a capacitor motor further comprising a main field winding 11 and an auxiliary field winding 12. Field windings 11 and 12 each have one of their terminals connected to one terminal of an A. C. voltage source 13 through a common lead, as shown, the latter including an N. O. (normally-open) contact 14 operated by a relay 14R in the D. C. relay circuit, as will be described. Auxiliary field winding 12 may have its other terminal selectively connected to the other terminal of voltage supply 13 through a condenser 15 or through an N. O. contact 16 operated by a relay 16R in the D. C. relay circuit, as hereinafter described, contact 16 in its closed position acting to short out condenser 15. Similarly, main field winding 11 may have its other terminal selectively connected to the other terminal of A. C. supply 13 through an N. C. (normally-closed) contact 16', operated by relay 16R, or through a second condenser 17. Contacts 16 and 16' are simultaneously and oppositely actuated by relay 16R; that is, when contact 16 is opened, contact 16' is closed, and vice versa.

The D. C. relay circuit comprises relays 14R and 16R which may be energized from a common source, as shown, one terminal of each of said relays being connected by a common lead, including a start switch 19a paralleled by an N. O. contact 14' operated by relay 14R, to one terminal of a D. C. voltage supply 18. The other terminal of relay 14R is connected to the other terminal of D. C. supply 18 through an N. C. contact 16" operated by relay 16R while the other terminal of relay 16R is connected to said other terminal of D. C. supply 18 through a switch 19b. A variable condenser 20 shunts relay 14R.

Operation of the present dynamic braking circuit is as follows: During normal running operation of the motor, the various contacts in the A. C. and D. C. circuits and switch 19a in the D. C. relay circuit will be in the positions illustrated. Thus, contacts 14' and 16" are closed and switch 19b is open whereby relay 14R is energized and relay 16R deenergized. In such energized condition of relay 14R, the contacts 14 thereof in the A. C. circuit is closed, and in the deenergized condition of relay 16R the contact 16 thereof is open and contact 16' thereof is closed whereby condenser 15 is in series circuit with auxiliary field winding 12 while condenser 17 is shorted out of the main field circuit 11. Current from A. C. supply 13 flows through both field circuits, condenser 15 functioning in the conventional manner to produce a phase difference of known sense between the voltages effective across the two fields, whereby rotor 10 is driven in some definite direction of rotation. When it is desired to stop the motor, switch 19b is actuated to its closed position whereby to effect energization of relay 16R. Upon energization of relay 16R, contacts 16 and 16' thereof are oppositely actuated, contact 16 being moved to its closed position, whereby to short condenser 15 out of the auxiliary field circuit 12, and contact 16' being moved to its open position, whereby condenser 17 is inserted into main field circuit 11. Such reversal of field condensers results in the application of reverse torque to rotor 10 whereby rotation of the latter will be rapidly stopped. Simultaneously with the actuation of contacts 16 and 16' to cause braking of the rotor 10, contact 16" of relay 16R is actuated to its open position whereby to interrupt the energizing circuit between D. C. supply 18 and relay 14R, whereupon variable condenser 20 discharges through relay 14R so as to maintain the latter in its energized condition for a period of time determined by the capacitance of condenser 20 and the resistance of the discharge path. Upon the discharge of condenser 20, relay 14R becomes deenergized and contacts 14 and 14' thereof are opened whereby to cut the power to the motor and relay circuits. The period of time during which a braking torque is applied to rotor 10 may be varied by adjustment of variable condenser 20, the setting of the latter to obtain optimum results being best determined by test.

Obviously, many modifications and variations of the present invention are possible in the light of the above teachings. It is therefore to be understood that within the scope of the appended claims the invention may be practiced otherwise than as specifically described.

What is claimed is:

1. A motor and motor plugging system comprising an electrical motor having circuitry controllable by switching action to reverse torque developed by the motor, a first relay having a normally-open contact, said normally-open contact when closed connecting said motor to an electrical power source, a second relay having a normally-closed contact, a first switch arranged to complete an energizing circuit for the first relay through said normally-closed contact whereby to close said normally-open contact and energize said motor, a second switch arranged to complete an energizing circuit for the second relay whereby to open said normally-closed contact, said second relay having additional contacts connected to effect said torque-reversal switching action when the second switch is closed, and said first relay having slow-release means to hold said normally-open contacts closed for a predetermined period after operation of said second switch, whereby to provide motor plugging action during said predetermined period.

2. A motor and motor plugging circuit as defined in claim 1, wherein said first relay has a holding contact paralleling said first switch.

3. A motor and motor plugging system as defined in claim 1, wherein said first relay is adapted and arranged for D. C. operation, and said slow-release means comprises a capacitive circuit paralleling said first relay.

4. A motor and motor plugging system as defined in claim 1, wherein said electrical motor is an A. C. motor of quadrature field type having two field circuits, each including a phasing capacitor, and wherein said additional contacts comprise a normally-open contact paralleling one said phasing capacitor and a normally-closed contact paralleling the other said phasing capacitor.

References Cited in the file of this patent

UNITED STATES PATENTS

| | | |
|---|---|---|
| 1,949,727 | Neis | Mar. 6, 1934 |
| 2,445,430 | Herchenroeder | July 20, 1948 |
| 2,467,582 | Corkran | Apr. 19, 1949 |

FOREIGN PATENTS

| | | |
|---|---|---|
| 319,684 | Great Britain | May 8, 1930 |

OTHER REFERENCES

Publication, "The Solar System," vol. IV, No. 1, May–June 1946.